United States Patent
Zelig et al.

(10) Patent No.: US 12,402,699 B2
(45) Date of Patent: Sep. 2, 2025

(54) USER-SERVICEABLE DEVICE

(71) Applicant: Microsoft Technology Licensing, LLC, Redmond, WA (US)

(72) Inventors: Casey Zelig, Lynnwood, WA (US); Ryan Eylander, Kent, WA (US); Daniel Dhondt, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 325 days.

(21) Appl. No.: 17/740,842

(22) Filed: May 10, 2022

(65) Prior Publication Data
US 2023/0363504 A1    Nov. 16, 2023

(51) Int. Cl.
*A45C 11/00* (2006.01)
(52) U.S. Cl.
CPC .............. *A45C 11/00* (2013.01); *A45C 11/002* (2025.01); *A45C 11/003* (2025.01); *A45C 2200/15* (2013.01)
(58) Field of Classification Search
CPC .............. A45C 11/00; A45C 2011/002; A45C 2011/003; A45C 2200/15; G06F 1/1656; G06F 1/166; G06F 1/1626
See application file for complete search history.

(56) References Cited

U.S. PATENT DOCUMENTS

| | | | | |
|---|---|---|---|---|
| 6,108,196 A | * | 8/2000 | Jung | ..................... G06F 1/1679 292/108 |
| 2004/0192418 A1 | | 9/2004 | Nam | |
| 2004/0203514 A1 | | 10/2004 | Cheng et al. | |
| 2008/0020614 A1 | * | 1/2008 | Park | ..................... H01R 13/635 439/159 |
| 2010/0151305 A1 | * | 6/2010 | Ouyang | .............. H01M 50/244 429/97 |
| 2011/0121584 A1 | | 5/2011 | Balk | |
| 2013/0048333 A1 | | 2/2013 | Shi et al. | |
| 2013/0242476 A1 | | 9/2013 | Tu | |
| 2014/0021727 A1 | * | 1/2014 | Mai | ....................... G06F 1/1679 292/254 |
| 2014/0091688 A1 | | 4/2014 | Narajowski et al. | |

(Continued)

OTHER PUBLICATIONS

"International Search Report and Written Opinion Issued in PCT Application No. PCT/US2023/013399", Mailed Date: Jun. 6, 2023, 12 Pages.

*Primary Examiner* — Allen L Parker
*Assistant Examiner* — Keon Nmn Kim
(74) *Attorney, Agent, or Firm* — Rainier Patents, P.S.

(57) ABSTRACT

The description relates to devices, such as user-serviceable devices. One example can include a chassis defining a cavity accessible through a rear side and a rear cover positioned against the chassis over the rear side. The device can be configured to allow movement between the rear cover and the chassis substantially parallel to the rear side to lock the rear cover against the chassis and to allow movement in an opposite direction to unlock the rear cover and further configured to impart a biasing force on the rear cover substantially perpendicular to the rear side. The device can also include a release that can be engaged through the chassis to cause the movement of the rear cover in the opposite direction to unlock the rear cover and allow the biasing force to move the rear cover substantially perpendicularly to the rear side away from the chassis.

20 Claims, 7 Drawing Sheets

(56) References Cited

U.S. PATENT DOCUMENTS

| | | |
|---|---|---|
| 2017/0003719 A1 | 1/2017 | Siddiqui |
| 2017/0063422 A1* | 3/2017 | Chen et al. |
| 2018/0164852 A1* | 6/2018 | Lim .................... H04M 1/0214 |
| 2019/0025879 A1* | 1/2019 | Koriyama ............... G06F 1/166 |
| 2019/0173506 A1 | 6/2019 | Cha |

* cited by examiner

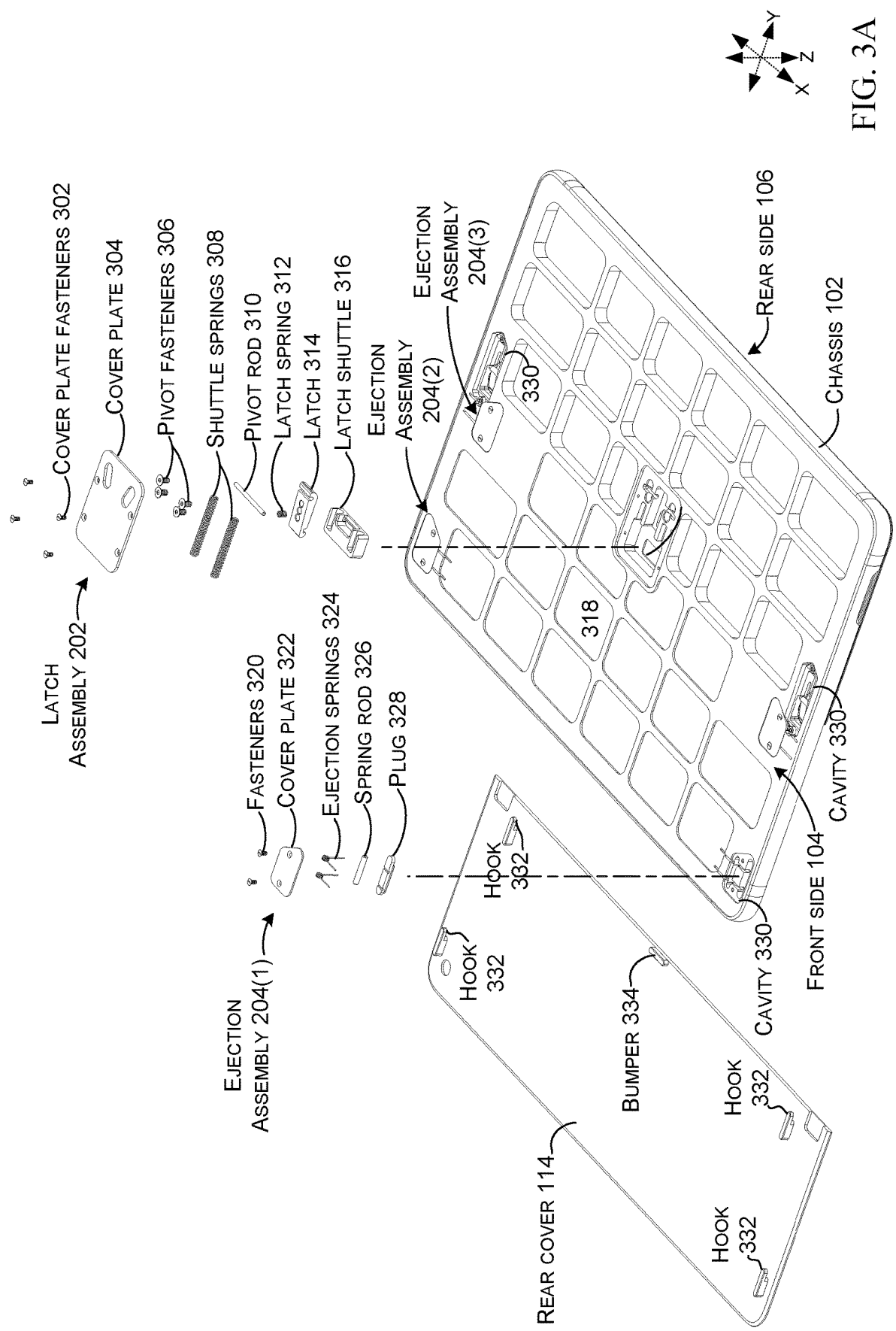

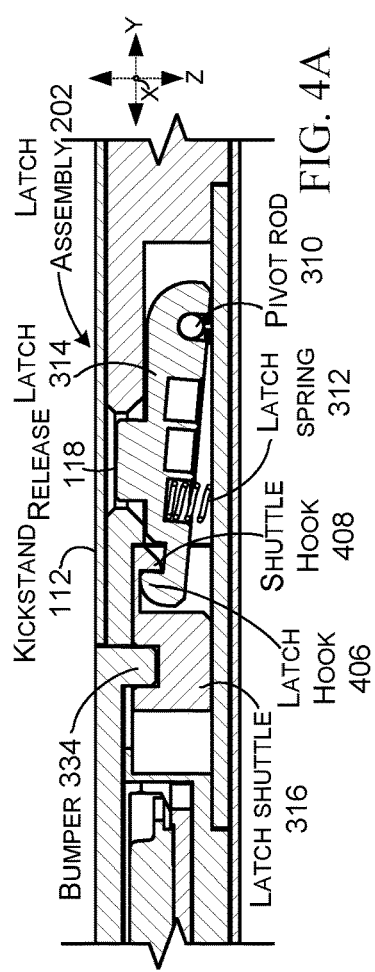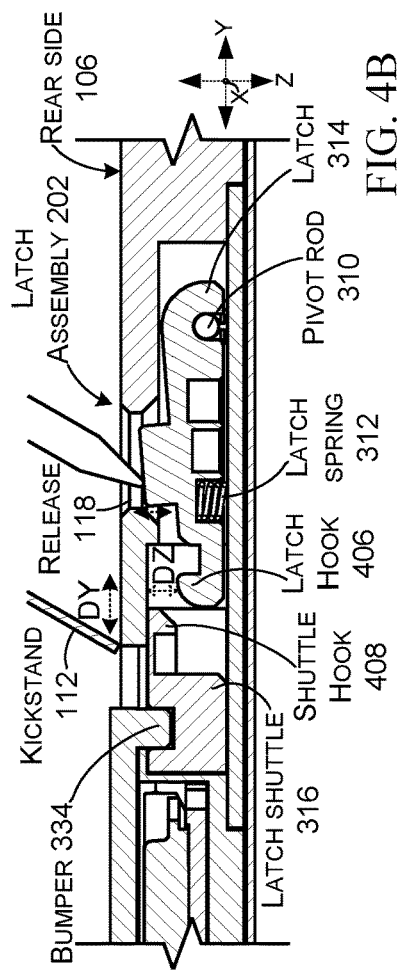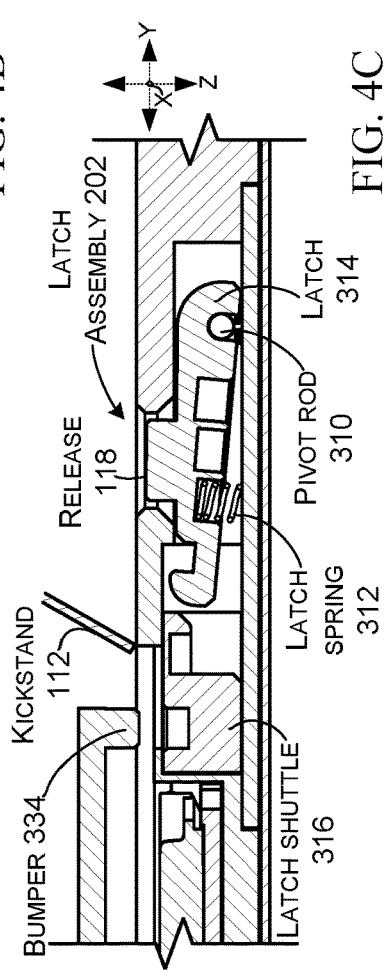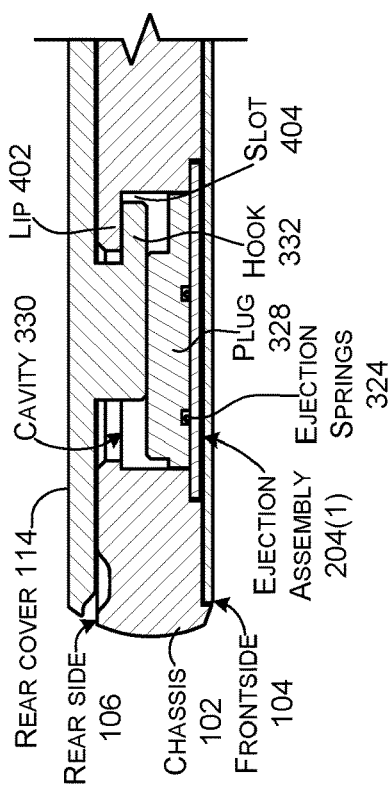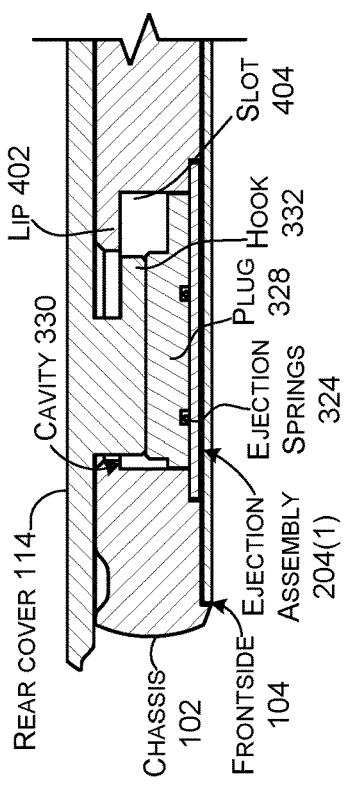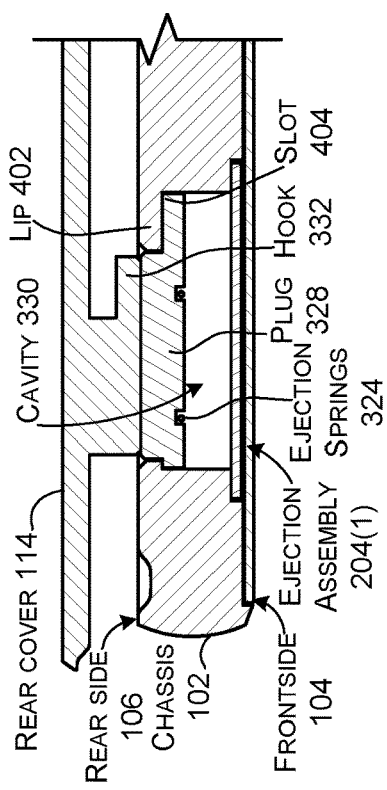
FIG. 4A  FIG. 4B  FIG. 4C

USER-SERVICEABLE DEVICE

BACKGROUND

The quest for ever thinner devices has led to devices being constructed in a manner that the devices tend to be difficult or impossible to service. This condition diminishes the user experience and can cause user alienation.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIG. 3A is an exploded perspective view of an example user-serviceable device in accordance with the present concepts.

FIGS. 4A-4C are sectional views of example user-serviceable devices in accordance with the present concepts.

SUMMARY

Figure 1A:
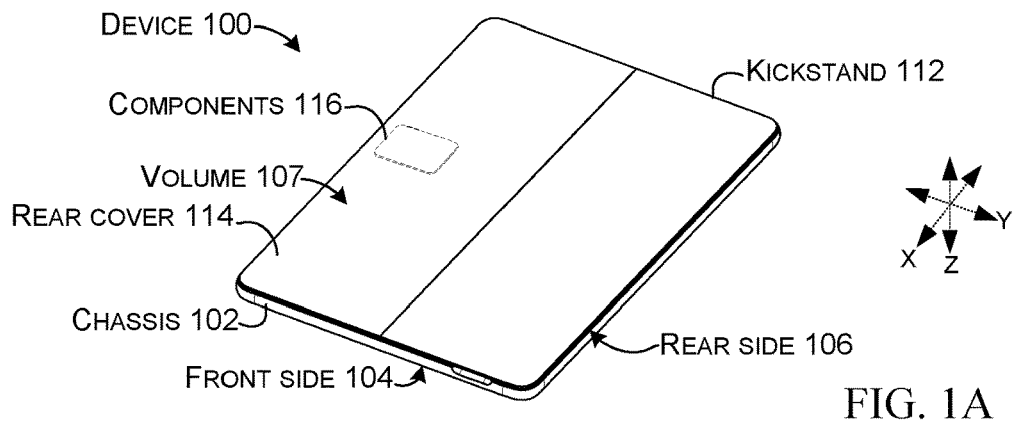
FIGS. 1A-1C, 2A, 2B, 3B, 3C, 5A, 5B, and 6 are perspective views of example user-serviceable devices in accordance with the present concepts.

This patent relates to devices, and more specifically to serviceability of devices. One example can include a chassis defining a front side and a rear side and a volume in between. The volume can be accessible through the rear side. In an operational state, a rear cover can be positioned against the chassis over the rear side. The device can be configured to allow movement between the rear cover and the chassis substantially parallel to the rear side to lock the rear cover against the chassis and to allow movement in an opposite direction to unlock the rear cover for servicing. The device can also be configured to impart a biasing force on the rear cover substantially perpendicular to the rear side. The device can include a release that can be engaged through the chassis to cause the movement of the rear cover to unlock the rear cover and allow the substantially perpendicular biasing force to move the rear cover away from the chassis.

DESCRIPTION

The present concepts relate to devices, such as computing devices that can include components positioned in a chassis or housing. Many computing devices employ a first portion (e.g., the chassis) and a corresponding second portion (e.g., cover) to form the volume or enclosure that holds the components, such as processors, batteries, etc. For many form factors, such as tablets, notebooks, and/or wearable devices, consumer preferences are toward smaller form factors, especially thinner (e.g., z-dimension constraints) and/or lighter form factors. These demands led to devices that were sealed at the factory, often with the device placed in an alignment die or mold that aligned the first and second portions and pressed them together to provide an aesthetically-pleasing form factor. A special adhesive, such as adhesive tape, was employed in the alignment die to bond the first and second portions. These devices are difficult to service and require special tools, such as heat guns to disassemble the first and second portions. Further, disassembly tends to damage at least the adhesive tape, among other components, such as those to which the adhesive tape is adhered. Thus, reassembly can only be accomplished with special tools and depends on the availability of replacement components, such as adhesive tape.

Other traditional configurations that offered better serviceability simply included a screw at each corner of the cover that fastened to the chassis. These traditional solutions left exposed screw heads that diminished the appearance of the device. The user could also lack the proper tools for removing the screws and/or lose the screws during the removal and reinstallation process. Covers could be employed over the screwheads to improve the appearance of the device, but those too could be lost.

In contrast, the present concepts can satisfy user demands relating to device dimensions and appearance while offering a user-serviceable configuration. The user-serviceable configuration can be disassembled and reassembled without any special tools and without replacing any components (e.g., no alignment dies and/or no sacrificial components). Despite this simplicity, the present concepts can offer simple removal of the cover with any stylus-shaped tool, such as a ball point pen. Reinstallation of the cover can be achieved without any tools simply by aligning the cover over the chassis and pressing downward and then sliding the cover back into the locked configuration.

Figure 1B:
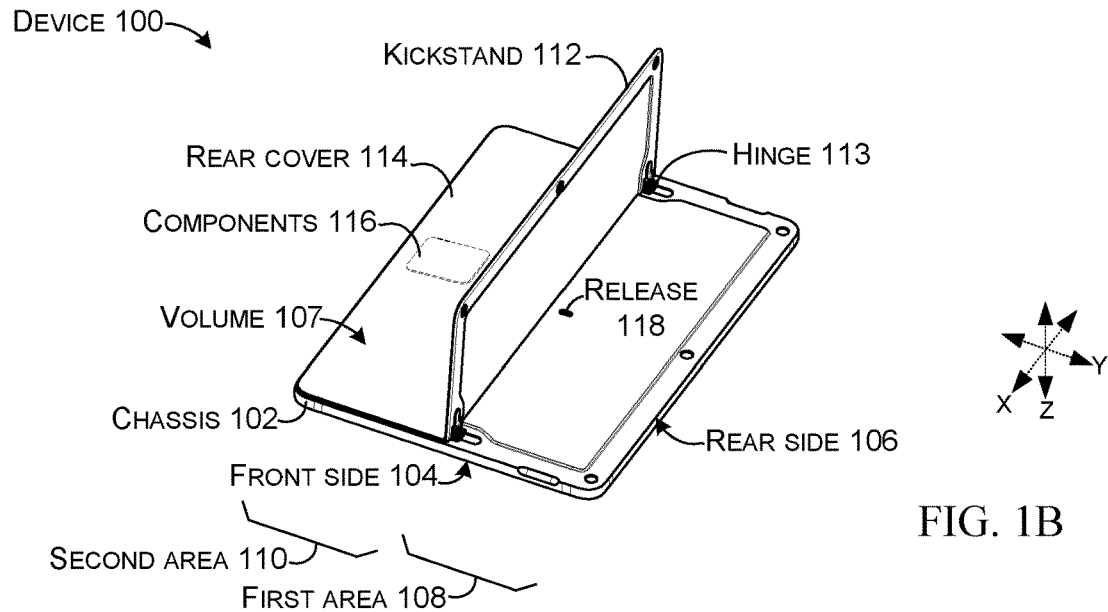
Figure 1C:
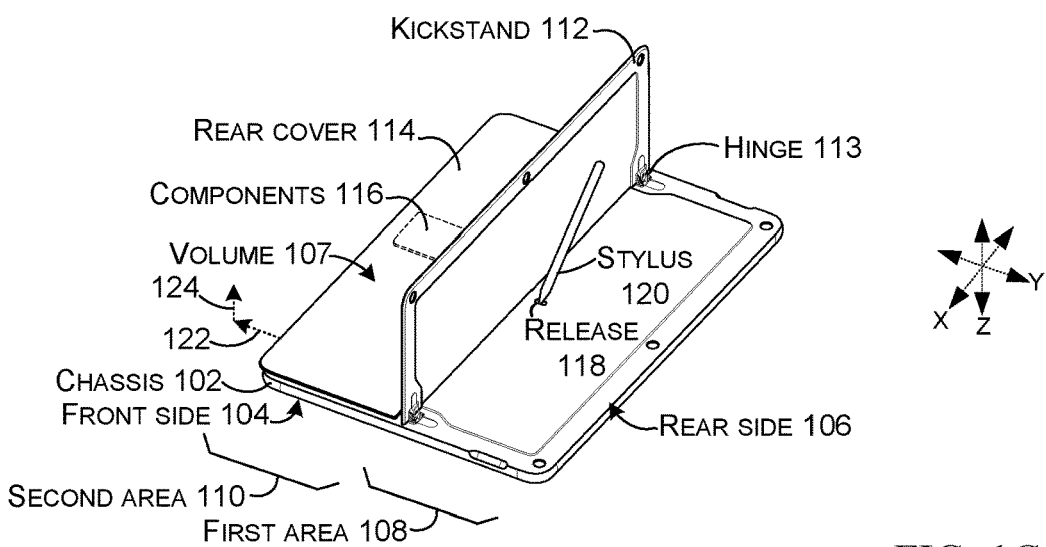

FIGS. 1A-1C collectively show some of the present concepts relative to an example device 100, such as a tablet type device. The device can include a chassis 102 that defines a first or front side 104, a second or rear side 106, and a volume 107 in between. A display, though not visible, can be positioned on the front side 104. The rear side can be divided into a first area 108 and a second area 110. In this example, the first and second areas 108 and 110 can be separated by a kickstand 112 that can be rotatably secured to the chassis 102 by a hinge 113. The kickstand 112 can be closed (e.g., folded) against the rear side 106 (e.g., against the first area 108). The kickstand 112 can also be rotated away from the rear side to various angles to support the device in various postures.

The second area 110 can be covered by a rear cover 114. The rear cover 114 can be removed to access the volume 107 and components 116, such as batteries, processors, memory/storage, positioned in the volume 107. (The components are shown in ghost because they would be occluded in these views). The rear cover can be reinstalled to protect the components 116 in the volume 107.

A release 118 can be positioned on the first area 108. In this configuration, the release 118 can be hidden when the kickstand 112 is closed and accessible when the kickstand is open. As shown in FIG. 1C, user activation of the release 118, such as by depressing the release with a stylus 120, can cause the rear cover 114 to move horizontally along the rear side 106 (e.g., along the xy reference plane) away from the first area 108 as indicated by arrow 122 and then to move up (e.g., away) from the rear side 106 (as indicated by arrow 124) where it can be lifted away to access the electronic components. Once finished, the user can re-install the rear cover 114 simply by placing it back on the second area of the chassis 102, pushing down (e.g., perpendicular to the rear side 106) and sliding it toward the first area 108 (e.g., parallel to the rear side 106).

Figure 2A:
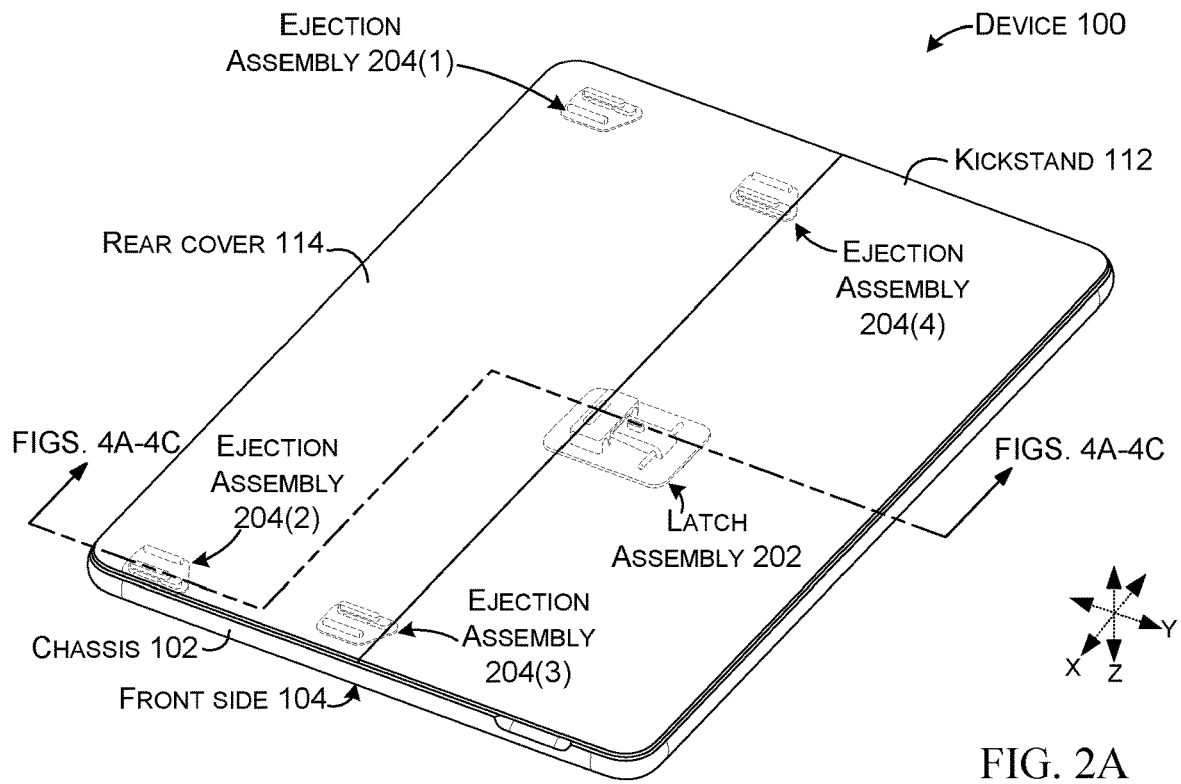
Figure 2B:
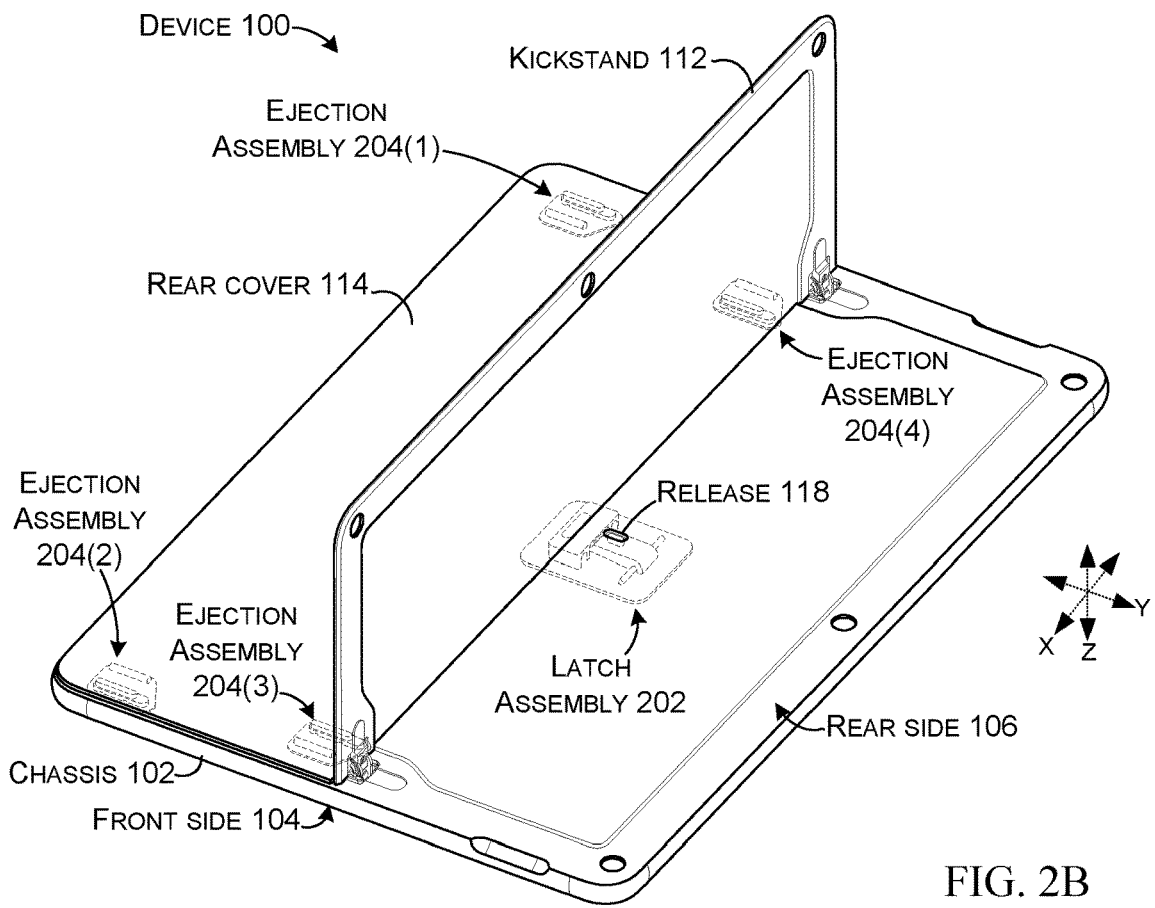

FIGS. 2A and 2B are similar to FIGS. 1A and 1B, respectively and can be considered collectively with FIGS. 1A-1C. FIGS. 2A and 2B show latch assembly 202 and ejection assemblies 204. These assemblies can lie beneath the rear side 106 and would not be visible in these views and thus are shown in ghost. The latch assembly 202 and ejection assemblies 204 can enable easy removal and replacement of the rear cover 114. These assemblies are discussed in more detail below and are illustrated here to orient the reader.

Figure 3B:
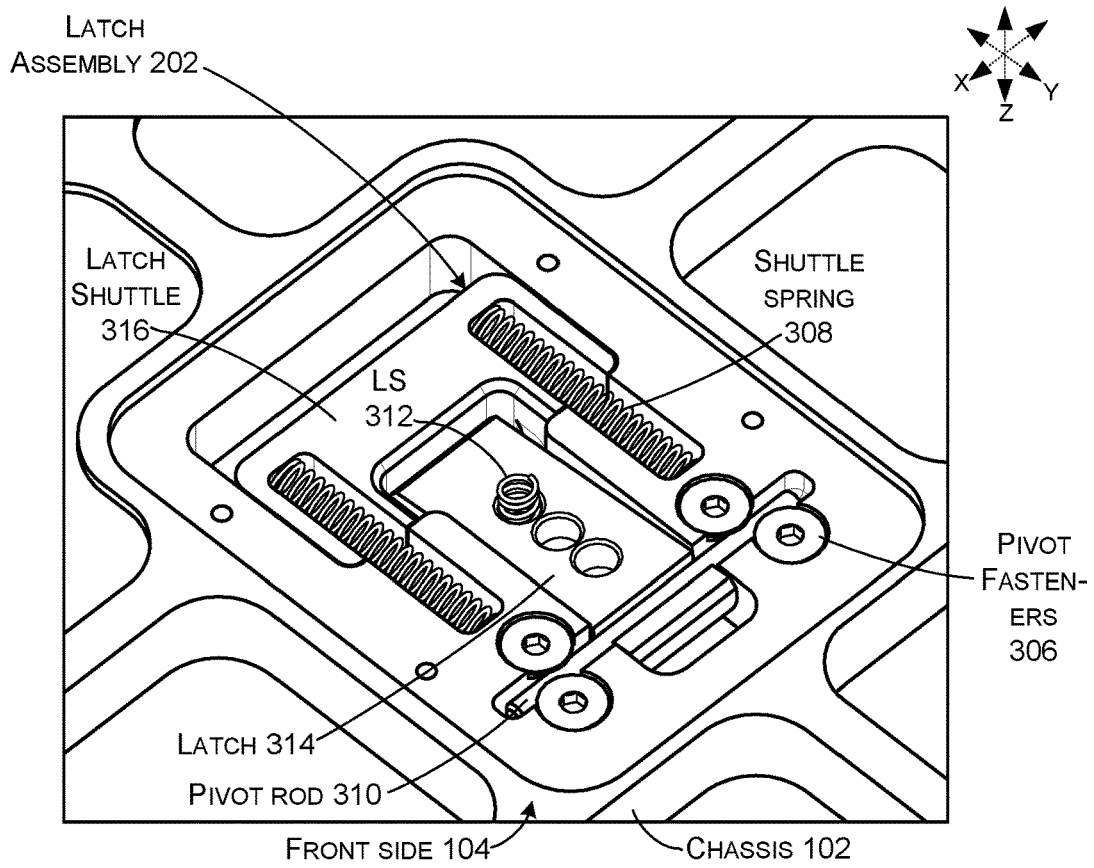
Figure 3C:
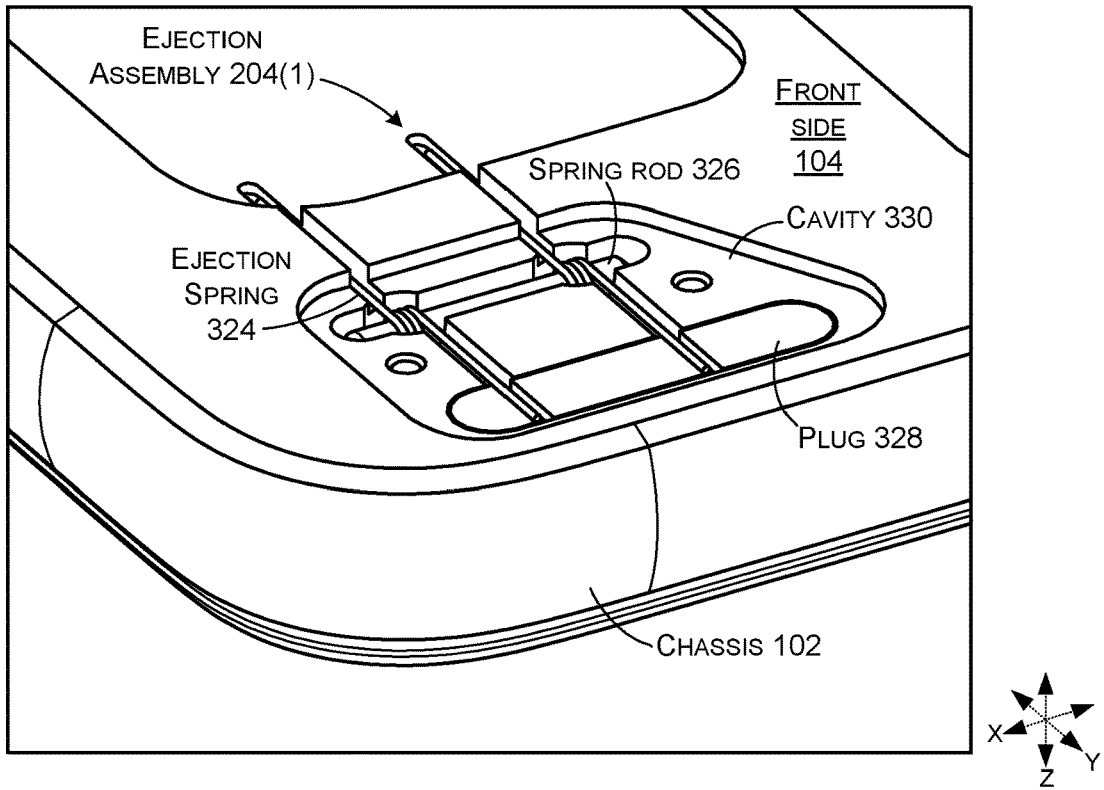

FIGS. 3A-3C collectively show additional components of device 100. FIG. 3A is an exploded perspective view of device 100. FIGS. 3B and 3C are enlarged views of a region of the device. In this case, front side 104 is facing upward, whereas in FIGS. 1A-1C and 2A and 2B, the rear side 106 is facing upward. In this implementation, latch assembly 202 includes cover plate fasteners 302, a cover plate 304, pivot fasteners 306, shuttle springs 308, pivot rod 310, latch spring 312, latch 314, and/or latch shuttle 316. These components of the latch assembly 202 can be positioned in a cavity 318 defined by the chassis 102. FIG. 3B shows these components of the latch assembly 202 assembled on the device but without the cover plate fasteners 302 and the cover plate 304.

In this configuration, individual ejection assemblies 204 are positioned in the chassis 102 to operate relative to the four corners of the rear cover. An alternative configuration for ejection assembly placement is described below relative to FIG. 6.

In FIG. 3A, as illustrated relative to ejection assembly 204(1), the ejection assemblies 204 can include fasteners 320, a cover plate 322, ejection springs 324, a spring rod 326, and/or a plug 328. These components of the ejection assembly 204 can be positioned in cavities 330 defined by the chassis 102. FIG. 3C shows the ejection assembly positioned in the cavity 330, but without the cover plate 322 and fasteners 320.

In FIG. 3A, hooks 332 are visible on the underside of the rear cover 114 (e.g., on the side that contacts the rear side 106). In this configuration, individual hooks 332 are positioned in each corner of the rear cover 114. Other configurations are contemplated and an alternative configuration is described below relative to FIG. 6. The hooks 332 can be positioned in the cavities 330 and interact with portions of the chassis 102 to releasably retain the rear cover on the chassis. This aspect will be shown and described below relative to FIGS. 4A-4C. The underside of the rear cover can also define a bumper 334. The bumper 334 can engage the latch assembly 202 as will be shown and described below relative to FIGS. 4A-4C.

FIGS. 4A-4C and 5A and 5B collectively show operational features of device 100. FIGS. 4A-4C are sectional views as indicated in FIG. 2A that collectively show operation of the latch assembly 202 and the ejection assembly 204 in relation to retaining and releasing the rear cover 114. In this configuration, chassis 102 defines lips 402 that partially extend over cavities 330 to define a slot 404. The slot 404 can be considered as a subset of the cavity 330.

FIG. 4A shows an operational configuration where the rear cover 114 is secured to the chassis 102 by the ejection assembly 204(1). At this point, the hooks 332 underly and engage the lips 402 of the chassis 102 to retain the rear cover 114 on the chassis 102. The hooks 332 and the lips 402 provide a technical solution of preventing movement of the rear cover 114 perpendicular to the rear side 106 while allowing seamless movement parallel to the rear side 106 (e.g., the hooks slideably engage the lips).

At this point, the ejection springs 324 have been compressed by the rear cover pushing the plugs 328 downward substantially perpendicular to the rear side 106 (e.g., in the z reference direction). The ejection springs 324 are thus creating a bias on the plugs 328 from the front side 104 toward the rear side 106. However, the plugs 328 cannot move upward because the hooks 332 are retained under the lips 402. This engagement between the hooks 332 of the rear cover 114 and the lips 402 of the chassis 102 is maintained by the latch assembly 202, which is preventing horizontal movement (e.g., movement in the y reference direction substantially parallel to the rear side 106) of the rear cover 114. As used herein, 'substantially parallel' can mean +/− about ten degrees from parallel, for example. Similarly, 'substantially perpendicular' can mean +/− about ten degrees from perpendicular, for example.

Figure 5A:
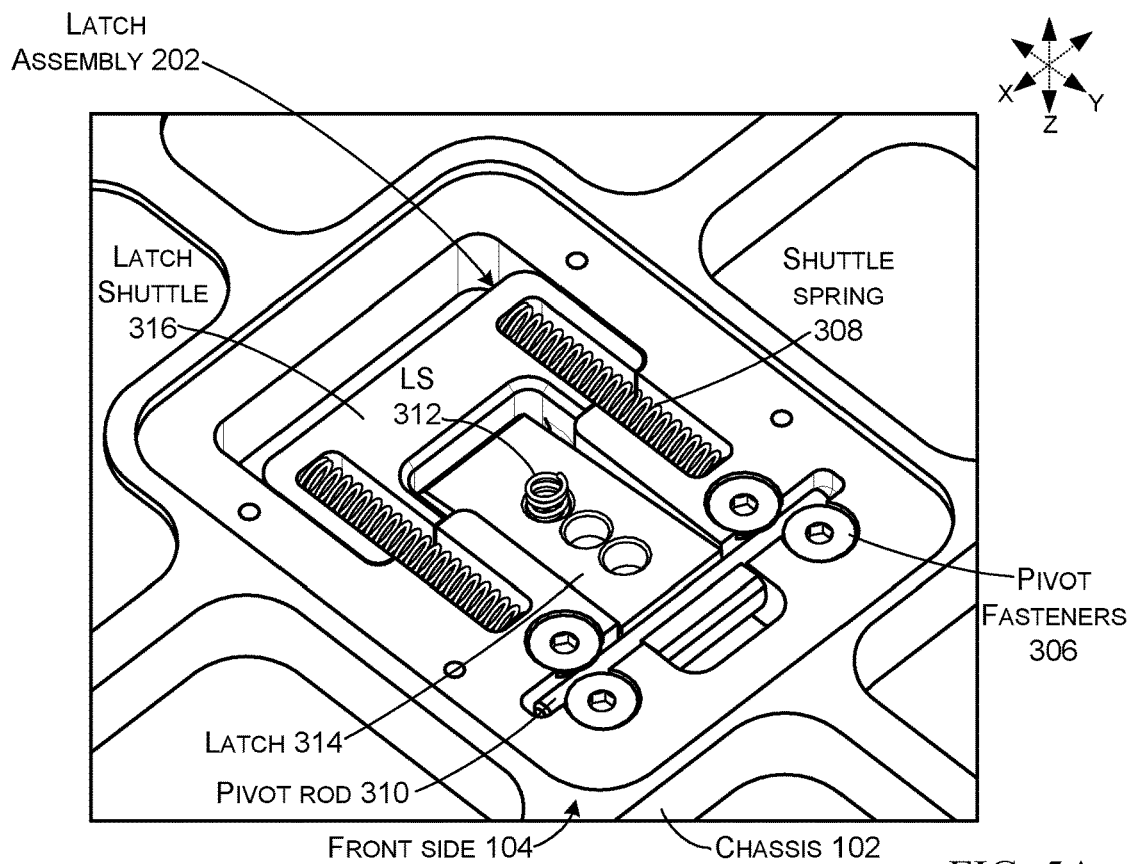
Figure 5B:
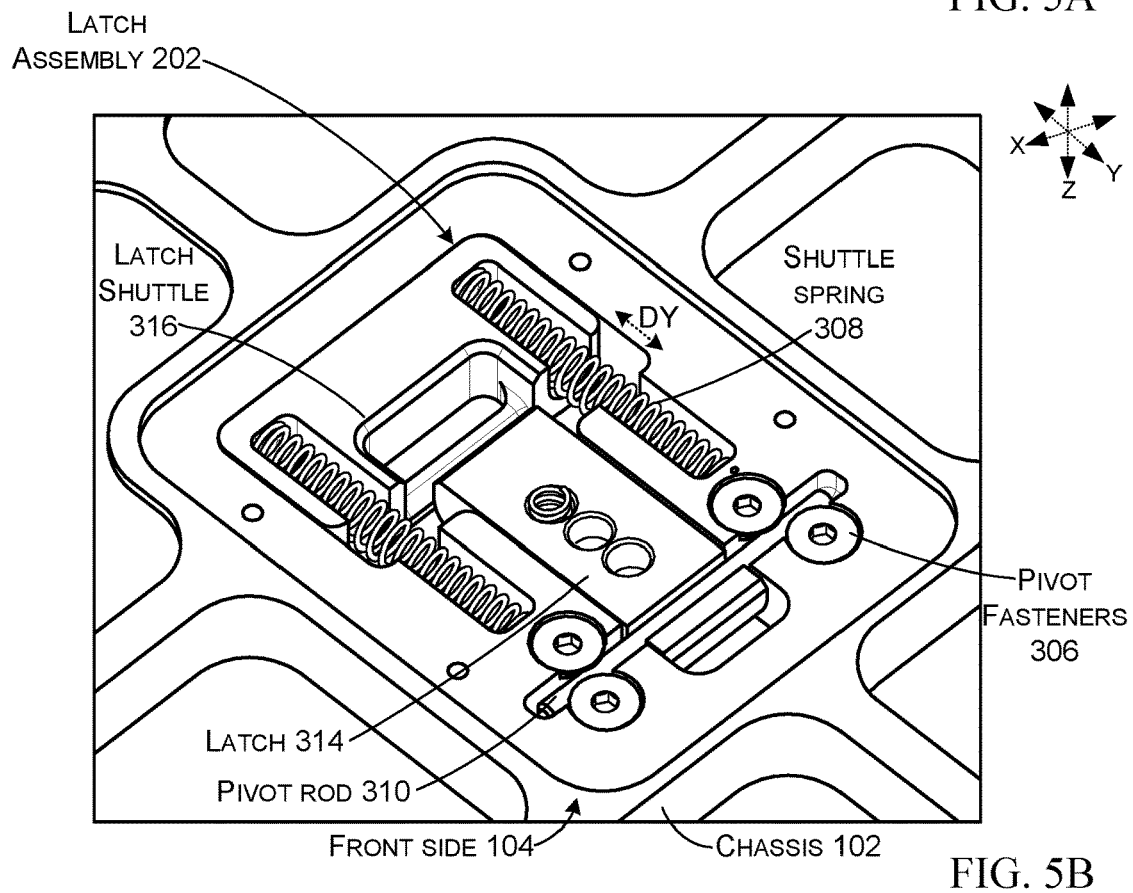

Looking at the latch assembly 202, the latch spring 312 is biasing the latch 314 up against the rear side 106 (e.g., the latch 314 is pivoting around the pivot rod 310). At this point, the latch 314 is biased toward the rear side 106 by the latch spring 312. This can be seen in both FIGS. 4A and 5A where latch spring 312 is extended and is biasing the latch 314 toward the rear side 106. The biasing of the latch 314 is causing a latch hook 406 to engage a corresponding latch shuttle hook 408. As shown in FIG. 5A, the shuttle springs 308 are compressed between the chassis 102 and the latch shuttle 316 and are creating a bias on the latch shuttle away from the latch 314. However, the latch spring 312 is biasing the latch 314 toward the rear side 106 and the shuttle hook 408 is essentially captured by the latch hook 406 and the rear cover 114 is maintained in the operational position despite the bias imparted by the shuttle springs 308. Thus, the latch assembly 202 provides a technical solution to selectively convey the bias that is parallel to the rear side 106 and when to block the bias from acting on the rear cover 114.

Note that shuttle springs 308, latch spring 312, and ejection springs 324 are employed in this implementation to create biases between components. Other biasing mechanisms are contemplated. For instance, compressible elastomeric materials can be used that can be compressed in one direction and create an opposing bias in the other opposite direction.

FIG. 4B shows user engagement of release 118 with a stylus 410. The user engagement can overcome the bias of latch spring 312 and push the release 118 downward toward the front side 104. This movement causing the latch 314 to pivot around pivot rod 310 and the latch hook 406 to move downwardly a distance in the z reference direction (DZ). This downward movement frees the shuttle hook 408 from the latch hook 406. At this point, as seen in FIG. 4B, the bias created by the shuttle springs 308 can now move the latch shuttle 316 away from the latch 314 in the y reference direction by a distance (DY). This y direction movement is conveyed to the rear cover 114 by the latch shuttle 316 acting on the bumper 334. As such, the rear cover 114 slides parallel to the rear side 106 and the hooks 332 are moved out from under the lips 402.

As shown in FIG. 4C, once the hooks 332 clear the lips 402, the bias imparted on the plugs 328 by the ejection springs 324 can move the plugs, and in turn the rear cover 114, upwardly in the z reference direction (e.g., in a direction from the front side 104 toward and through the rear side 106). The plugs 328 have now moved upward until they are flush with the rear side 106 and are occupying space previously occupied by the hooks 332. Further upward movement of the plugs 328 is blocked by contact between the plugs 328 and the chassis 102. The plugs 328 are blocking the cavities 330 so that foreign materials cannot enter the cavities. The plugs 328 being flush with the rear side 106 can also contribute to an aesthetically pleasing uniform rear side. At this point, the rear cover 114 is no longer constrained and can be lifted off by the user to access components positioned in the chassis. Note that there are no loose components, such as fasteners for the user to keep track of or lose.

Thus, the plugs 328 provide two technical solutions. First the plugs transfer the upward bias force that is perpendicular to the rear surface to the hooks 332 and the rear cover 114. Second, the plugs 328 can fill the cavities 330 when the rear cover 114 is removed to prevent foreign materials from entering the cavities 330 and potentially interfering with the function of the ejection assemblies 204 when the rear cover 114 is re-installed.

To reinstall the rear cover 114, the process can be reversed. The user can place the rear cover 114 on the rear side 106 as shown in FIG. 4C. The user then pushes downward to compress the ejection springs 324 until the hooks 332 clear the lips 402 similar to FIG. 4B. The user can then move the rear cover 114 horizontally until the shuttle hooks 408 re-engage the latch hooks 406 similar to FIG. 4A.

Figure 6:
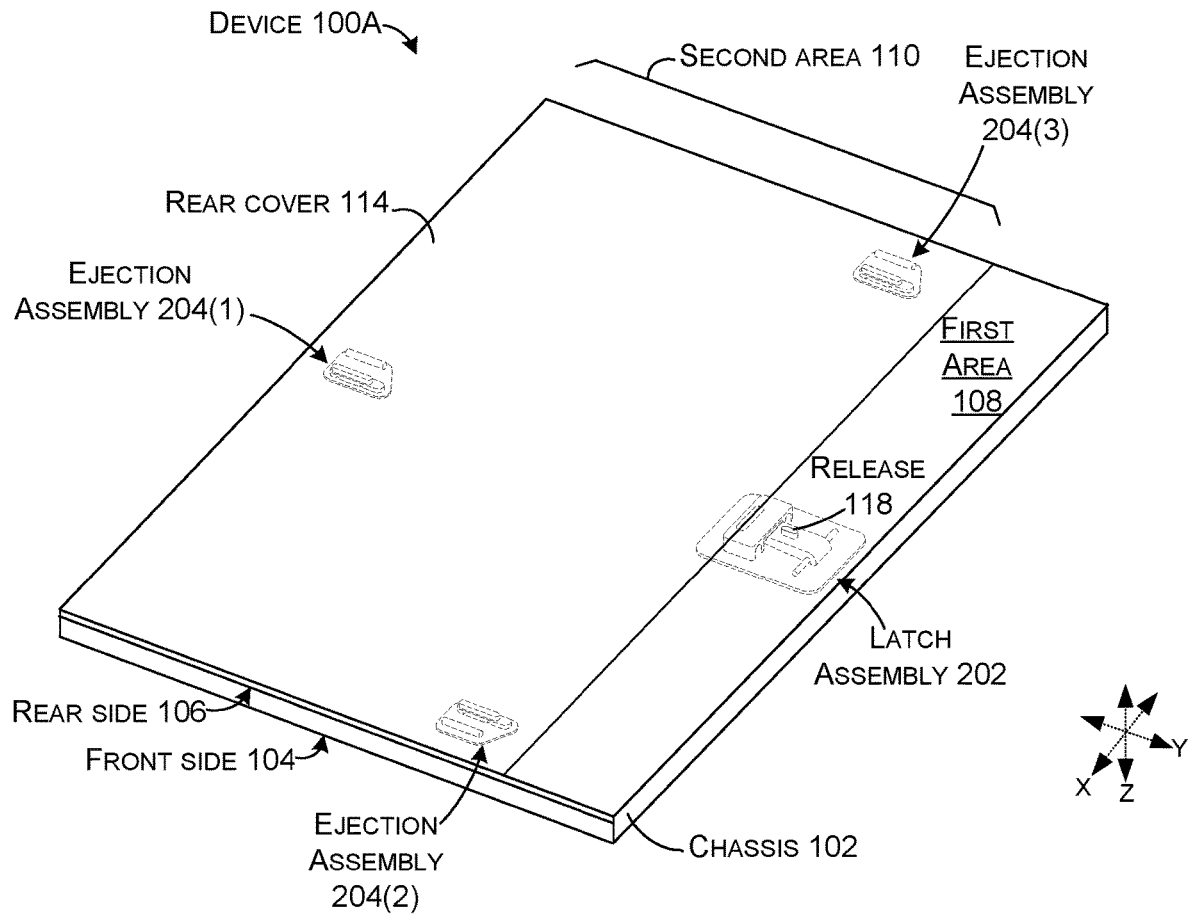

Looking at FIGS. 4A-4C again collectively, the latch assembly 202 and the ejection assemblies 204 collectively provide a technical solution that provides a quick and easy access to internal components for the purposes of repair and/or upgrade. The latch assembly 202 can include the small, easily actuated release 118. In this implementation the release 118 is hidden under kickstand 112. This configuration can provide a technical solution of an easy release mechanism that is hidden to avoid accidental engagement. FIG. 6 shows an alternative configuration. The release 118 provides a technical solution that changes the state of the latch assembly 202 and allows the force or bias parallel to the rear side 106 to be conveyed to the rear cover 114 to move the rear cover parallel to the rear side. Further, the latch shuttle 316 can provide a technical solution that laterally conveys spring force across a distance. Thus, the latch assembly 202 can be positioned in the first area 108, but convey a force on the rear cover 114 located in the second area 110.

When the user engages the release 118, such as by pressing down with a pointed tool, such as a stylus, the rear cover 114 self-ejects from rear of device 100. The rear cover 114 can be totally uniform on its exposed surface (e.g., no fasteners access ports, etc.). The underside of the rear cover can include hooks 332 that engage lips 402 on the chassis 102 to retain the rear cover 114. When the hooks 332 disengage from the lips 402 due at least in part to lateral y direction movement, the plugs 328 are biased (e.g., in the z direction) toward the rear side 106 by ejection springs 324. The plugs 328 provide a dual functionality technical solution of popping the rear cover 114 up from the chassis 102 so it can be readily removed by the user and the plugs 328 fill the cavity 330 at the rear side 106 to provide a self-closing feature. The self-closing feature prevents dirt/moisture ingress while the rear cover 114 is removed from device 100.

Reattachment or reinstallation of the rear cover 114 can be accomplished with two motions, press down and slide over. These motions are equivalent to the removal motion described with arrows 122 and 124 in FIG. 1C, except that the order and direction are reversed (e.g., slide and then up to release versus down and then slide to re-install).

Compared to other solutions such as fasteners or adhesive, the present concepts provide a faster and more convenient removal and reattachment experience of the rear cover by the user. There are no loose parts, such as screws that can be lost, and no sacrificial parts, such as adhesive tape that need to be replaced.

The plugs 328 can also provide visual guidance for reinstallation of the rear cover 114. The user can place the rear cover 114 on the chassis 102 so the hooks 332 are on the plugs 328 and the bumper 334 is positioned at the latch shuttle 316. Once the rear cover 114 is aligned, the user can press down on the rear cover to overcome the bias of the ejection springs 324, compress the ejection springs, and force the hooks 332 into the cavities 330. The user can then slide the cover laterally into position so the hooks 332 are under the lips 402. This lateral movement simultaneously causes the bumper 334 which is received in the latch shuttle 316 to move the latch shuttle 316 so that the shuttle hook 408 overrides and engages the latch hook 406 and the latch 314 resets and retains the latch shuttle 316 and via the latch shuttle, the rear cover 114. This motion also compresses shuttle springs 308 and thus provides the energy for the automatic sliding of the rear cover when the release is depressed. At some subsequent point, the user can engage the release 118 to remove the rear cover 114 in a fraction of a second because the shuttle springs slide the rear cover 114 parallel to the rear side 106 and then the ejection springs 324 automatically pop the rear cover up and perpendicularly away from the rear side 106. Thus, collectively, the shuttle springs 308 and the ejection springs 324 provide a technical solution that allows the user to re-install the rear cover 114 with a simple motion (e.g., down then sideways) rather than having to become proficient at an angled or curved installation path.

FIG. 6 shows another example device 100A. In this case, the chassis 102 defines the first area 108 of the rear side 106. The second area 110 of the rear side 106 is covered by the rear cover 114. The latch assembly 202 is positioned relative to the first area 108 and interacts with the rear cover 114 as explained above relative to FIGS. 1A-5B. The release 118 is positioned on and accessed at the first area 108. In this implementation, three ejection assemblies 204 secure the rear cover 114 to the rear side of the chassis 102. Other numbers of ejection assemblies are contemplated. In these configurations, the latch assembly 202 can provide a technical solution for whether the device is in an operation condition or a service condition. If the user engages the release to service the device, the latch assembly 202 provides a spring force or bias to move the rear cover 114 parallel to the rear side 106. This parallel movement can release the rear cover's hooks from the chassis and allow the ejection assemblies 204 to automatically bias the rear cover 114 away from the rear side 106 so the user can access the components in the chassis.

The present concepts can be utilized with various types of user-serviceable devices, such as computing devices that can include, but are not limited to, notebook computers, tablet type computers, smart phones, wearable smart devices, gaming devices, entertainment consoles, and/or other developing or yet to be developed types of devices. As used herein, a computing device can be any type of device that has some amount of processing and/or storage capacity and/or other components. A mobile computing device can be any computing device that is intended to be readily transported by a user.

Various examples are described above. Additional examples are described below. One example includes a device comprising a chassis defining a front side and a rear side, a kickstand that is rotatably secured to the rear side by a hinge that divides that rear side into a first area and a second area, the kickstand configured to fold against the first area for storage or be angled away from the first area to support the chassis, a rear cover positioned over the second area of the rear side to protect components positioned in the chassis, an ejection assembly positioned at the second area and configured to maintain the rear cover against the chassis, and a latch assembly positioned at the first area and comprising a release that is hidden by the kickstand when the kickstand is folded against the first area and that can be engaged through the first area when the kickstand is angled away from the first area and engagement of the release is configured to cause the rear cover to move away from the kickstand substantially parallel to the rear side until released by the ejection assembly.

Another example can include any of the above and/or below examples where the rear cover defines hooks that slideably engage lips defined by the chassis, and based at least on the rear cover movement away from the kickstand the hooks are configured to disengage from the lips.

Another example can include any of the above and/or below examples where, based in part on the hooks disengagement from the lips, the ejection assembly is configured to bias the rear cover away from the rear side.

Another example can include any of the above and/or below examples where the ejection assembly comprises ejection springs that bias plugs toward the rear cover.

Another example can include any of the above and/or below examples where, based at least on the ejection assembly movement of the rear cover away from the chassis, the plugs are configured to fill cavities that were occupied by the hooks.

Another example can include any of the above and/or below examples where the latch assembly defines a latch that is configured to rotate around a pivot rod and that is biased toward the rear side by a latch spring.

Another example can include any of the above and/or below examples where the latch defines a latch hook.

Another example can include any of the above and/or below examples where the latch assembly further comprises a latch shuttle that defines a shuttle hook and wherein the shuttle hook is configured to be captured by the latch hook when the latch is biased against the rear side.

Another example can include any of the above and/or below examples where the latch shuttle is biased away from the latch by shuttle springs and wherein engagement of the release is configured to free the shuttle hook and allow the shuttle springs to move the shuttle away from the latch.

Another example can include any of the above and/or below examples where wherein the latch shuttle engages the rear cover and is configured to move the rear cover away from the kickstand based in part on the shuttle springs movement of the shuttle away from the latch.

Another example includes a device comprising a chassis defining a volume, a rear cover positioned against the chassis and providing access to the volume, an ejection assembly positioned on the chassis and configured to engage hooks on the rear cover to maintain the rear cover against the chassis over the volume, and a latch assembly positioned on the chassis and comprising a release that can be engaged through the chassis to cause a latch to pivot away from a latch shuttle to allow the latch shuttle and the rear cover to be moved by a shuttle spring until the hooks disengage from the chassis.

Another example can include any of the above and/or below examples where the shuttle spring is compressed between the latch and the latch shuttle or wherein the shuttle spring is compressed between the chassis and the latch shuttle.

Another example can include any of the above and/or below examples where the latch shuttle engages a bumper on an underside of the rear cover.

Another example can include any of the above and/or below examples where the ejection assembly comprises ejection springs that bias the rear cover substantially perpendicular to the bias of the shuttle springs.

Another example can include any of the above and/or below examples where ejection springs contact plugs and bias the plugs against the hooks and wherein based in part on the rear cover movement away from the ejection springs the plugs fill a cavity that was occupied by the hooks.

Another example can include any of the above and/or below examples where no fasteners extend through or are exposed on the rear cover when the rear cover is installed on the chassis over the cavity.

Another example includes a device comprising a chassis defining a volume accessed through a rear side, a rear cover positioned against the chassis over the rear side, an ejection assembly positioned on the chassis and configured to allow movement between the rear cover and the chassis substantially parallel to the rear side to lock the rear cover against the chassis and to allow movement in an opposite direction to unlock the rear cover and further configured to impart a biasing force on the rear cover substantially perpendicular to the rear side, and a latch assembly positioned on the chassis and comprising a release that can be engaged through the chassis to cause the movement of the rear cover in the opposite direction to unlock the rear cover and allow the biasing force to move the rear cover substantially perpendicularly to the rear side away from the chassis.

Another example can include any of the above and/or below examples where the ejection assembly is positioned in a cavity in the chassis and wherein the ejection assembly comprises a plug that is biased against the rear cover.

Another example can include any of the above and/or below examples where the plug fills the cavity at the rear side based in part on the rear cover removal.

Another example can include any of the above and/or below examples where the ejection assembly comprises an ejection assembly at each corner of the rear cover.

Conclusion

Although techniques, methods, devices, systems, etc., pertaining to user-serviceable devices are described in language specific to structural features and/or methodological acts, it is to be understood that the subject matter defined in the appended claims is not necessarily limited to the specific features or acts described. Rather, the specific features and acts are disclosed as example forms of implementing the claimed methods, devices, systems, etc.

The invention claimed is:

1. A device, comprising:
a chassis defining a front side and a rear side;
a kickstand that is rotatably secured to the rear side by a hinge that divides that rear side into a first area and a second area, the kickstand configured to fold against the first area for storage or be angled away from the first area to support the chassis;
a rear cover positioned over the second area of the rear side to protect components positioned in the chassis;
an ejection assembly positioned at the second area and configured to maintain the rear cover against the chassis; and,
a latch assembly positioned at the first area and comprising a release that is hidden by the kickstand when the kickstand is folded against the first area and that can be engaged through the first area when the kickstand is angled away from the first area and engagement of the release is configured to cause the rear cover to move away from the kickstand substantially parallel to the rear side until released by the ejection assembly.

2. The device of claim 1, wherein the rear cover defines hooks that slideably engage lips defined by the chassis, and based at least on the rear cover movement away from the kickstand the hooks are configured to disengage from the lips.

3. The device of claim 2, wherein based in part on the hooks disengagement from the lips, the ejection assembly is configured to bias the rear cover away from the rear side.

4. The device of claim 3, wherein the ejection assembly comprises ejection springs that bias plugs toward the rear cover.

5. The device of claim 4, wherein based at least on the ejection assembly movement of the rear cover away from the chassis the plugs are configured to fill cavities that were occupied by the hooks.

6. The device of claim 1, wherein the latch assembly defines a latch that is configured to rotate around a pivot rod and that is biased toward the rear side by a latch spring.

7. The device of claim 6, wherein the latch defines a latch hook.

8. The device of claim 7, wherein the latch assembly further comprises a latch shuttle that defines a shuttle hook and wherein the shuttle hook is configured to be captured by the latch hook when the latch is biased against the rear side.

9. The device of claim 8, wherein the latch shuttle is biased away from the latch by shuttle springs and wherein engagement of the release is configured to free the shuttle hook and allow the shuttle springs to move the shuttle away from the latch.

10. The device of claim 9, wherein the latch shuttle engages the rear cover and is configured to move the rear cover away from the kickstand based in part on the shuttle springs movement of the shuttle away from the latch.

11. A device, comprising:
a chassis defining a volume;
a rear cover positioned against the chassis and providing access to the volume;
an ejection assembly positioned on the chassis and configured to engage hooks on the rear cover to maintain the rear cover against the chassis over the volume; and,
a latch assembly positioned on the chassis and comprising a release that can be engaged through the chassis to cause a latch to pivot away from a latch shuttle to allow the latch shuttle and the rear cover to be moved by a shuttle spring until the hooks disengage from the chassis, the latch shuttle being configured to travel in a linear direction towards and against the chassis by elongation of the shuttle spring from a compressed configuration.

12. The device of claim 11, wherein the shuttle spring is compressed between the latch and the latch shuttle or wherein the shuttle spring is compressed between the chassis and the latch shuttle.

13. The device of claim 12, wherein the latch shuttle engages a bumper on an underside of the rear cover.

14. The device of claim 13, wherein the ejection assembly comprises ejection springs that bias the rear cover substantially perpendicular to the bias of the shuttle springs.

15. The device of claim 14, wherein the ejection springs contact plugs and bias the plugs against the hooks and wherein based in part on the rear cover movement away from the ejection springs the plugs fill a cavity that was occupied by the hooks.

16. The device of claim 15, wherein no fasteners extend through or are exposed on the rear cover when the rear cover is installed on the chassis over the cavity.

17. A device, comprising:
a chassis defining a volume accessed through a rear side;
a rear cover positioned against the chassis over the rear side;
an ejection assembly positioned on the chassis and configured to allow movement between the rear cover and the chassis substantially parallel to the rear side to lock the rear cover against the chassis and to allow movement in an opposite direction to unlock the rear cover and further configured to impart a biasing force on the rear cover substantially perpendicular to the rear side; and,
a latch assembly positioned on the chassis and comprising a release that can be engaged through the chassis to cause the movement of the rear cover in the opposite direction to unlock the rear cover and allow the biasing force to move the rear cover substantially perpendicularly to the rear side away from the chassis, the latch assembly includes a shuttle spring configured to provide a first biasing force for the parallel movement and an ejection spring configured to provide a second biasing force for the perpendicular movement, the shuttle spring being compressed in a direction parallel to the rear side when the rear cover is in a locked position.

18. The device of claim 17, wherein the ejection assembly is positioned in a cavity in the chassis and wherein the ejection assembly comprises a plug that is biased against the rear cover.

19. The device of claim 18, wherein the plug fills the cavity at the rear side based in part on the rear cover removal.

20. The device of claim 19, wherein the ejection assembly comprises an ejection assembly at each corner of the rear cover.

* * * * *